(12) United States Patent
Jetzek et al.

(10) Patent No.: US 6,546,252 B1
(45) Date of Patent: Apr. 8, 2003

(54) SYSTEM AND METHOD FOR ESTIMATING INTERFREQUENCY MEASUREMENTS USED FOR RADIO NETWORK FUNCTION

(75) Inventors: Ulrich Jetzek, Nürnberg (DE); Walter Müller, Upplands Väsby (SE); Lars B Johansson, Linköping (SE); Petter Blomberg, Sundbyberg (SE); Peter Butovitsch, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/464,484

(22) Filed: Dec. 15, 1999

(30) Foreign Application Priority Data

Dec. 18, 1998 (WO) .............................. PCT/IB98/02071

(51) Int. Cl.[7] ................................................. H04Q 7/20
(52) U.S. Cl. ...................................... 455/437; 370/332
(58) Field of Search ............................... 455/436, 437, 455/438, 439, 443, 524, 525, 62, 63, 522; 370/331, 332

(56) References Cited

U.S. PATENT DOCUMENTS

| | | |
|---|---|---|
| 5,230,081 A | 7/1993 | Yamada et al. |
| 5,353,332 A | 10/1994 | Raith et al. |
| 5,420,864 A | 5/1995 | Dahlin et al. |
| 5,430,720 A | 7/1995 | Larsson et al. |
| 5,509,016 A | 4/1996 | Muller |
| 5,634,192 A * | 5/1997 | Meche et al. |
| 5,809,430 A * | 9/1998 | D'Amico |
| 6,067,446 A | 5/2000 | Persson et al. |
| 6,131,035 A * | 10/2000 | Ohkubo et al. |

FOREIGN PATENT DOCUMENTS

| | | |
|---|---|---|
| EP | 0 693 834 | 1/1996 |
| EP | 0 797 369 | 9/1997 |
| WO | WO98/30043 | 7/1998 |

OTHER PUBLICATIONS

Klein, A. et al., "FRAMES Multiple Access Mode 1–Wideband TDMA with and without Spreading", *Process IEEE International Conference on Personal Indoor and Mobile Radio Communication* vol. 1, Sep. 1997, pp. 37–41.

Ovesjö, F. et al., "FRAMES Multiple Access Mode 2–Wideband CDMA", *Process IEEE International Conference on Personal Indoor and Mobile Radio Communication*, vol. 1, Sep. 1997, pp. 42–46.

"Vol. 3 Specification of Air–interface for the 3GMobile System", Ver. 0–3., IMT–2000 Study Committee Air–interface WG, SWG2, pp1–24, Dec. 1, 1997.

"UTRA Physical Layer Description FDD parts" vol. 1, ETSI SMG2 UMTS Physial Layer Expert Group, Tdoc SMG2 UMTS–L1 56/98, Meeting 2, Paris, France, Apr. 28, 1998, pp1–11, Apr. 24, 1998.

* cited by examiner

Primary Examiner—Nguyen T. Vo

(57) ABSTRACT

Systems and methods for estimating inter-frequency measurements used for radio network functions are disclosed. The systems and methods described allow systems to evaluate the quality of a second frequency by using offset adjusted measurements on a first frequency. By using the described methods, system capacity is increased by providing a "low cost" measurement mechanism for support of handover that substantially balance the load between two or more frequency bands. By using the proposed method, handover can be performed more frequently and the interference within each frequency band can therefore be kept at a more optimal level.

18 Claims, 2 Drawing Sheets

SYSTEM AND METHOD FOR ESTIMATING INTERFREQUENCY MEASUREMENTS USED FOR RADIO NETWORK FUNCTION

This application claims priority under 35 U.S.C. §119 to PCT/IB98/02071 filed in International Bureau of WIPO on Dec. 17, 1998, the entire content of which is hereby incorporated by reference.

BACKGROUND

This invention relates to cellular radio communication systems and more particularly to increasing system capacity. System capacity is increased by providing handover mechanisms that substantially assist in keeping the load within each of two or more frequency bands balanced. Thus, interference within each of these frequency bands can be kept at a level that does not lead to severe performance degradation.

Continuing growth in telecommunications is placing increasing stress on the capacity of cellular systems. The limited frequency spectrum available for cellular communications demands cellular systems having increased network capacity and adaptability to various communications traffic situations. Although the introduction of digital modulation to cellular systems has increased system capacity, these increases alone may be insufficient to satisfy added demand for capacity and radio coverage. Other measures to increase capacity, such as decreasing the size of cells in metropolitan areas, may be necessary to meet growing demand.

Another method of increasing capacity is through the use of spread spectrum modulation and code division multiple access (CDMA) techniques. In typical direct sequence CDMA systems, an information data stream to be transmitted is superimposed on a much-higher-symbol-rate data stream, sometimes known as a spreading sequence. Each symbol of the spreading sequence is commonly referred to as a chip. Each information signal is allocated a unique spreading code that is used to generate the spreading sequence typically by periodic repetition. The information signal and the spreading sequence is typically combined by multiplication in a process sometimes called coding or spreading the information signal. A plurality of spread information signals are transmitted as modulations of radio frequency carrier waves and are jointly received as a composite signal at a receiver. Each of the spread signals overlaps all of the other coded signals, as well as noise-related signals, in both frequency and time. By correlating the composite signal with one of the unique spreading sequences, the corresponding information signal can be isolated and decoded. Since signals in CDMA systems overlay one another in frequency and time, they are frequently referred to as being self-interfering.

The coverage area of a mobile communication system may be subdivided into cells, depending on the system. A cell may be defined as the area that is covered by one base station. The base station is generally located in the center of the cell. Each cell might be an omnicell covering 360-degrees or the cell might be split up into several sectors, e.g., three sectors that cover a 120-degree angle each, which is referred to as physical sectors.

The base station serves as an interface between the mobile station (MS) and the fixed network. In a call situation, a MS may be connected via one or more logical sectors of a frequency band to one (or more) base stations (BTSs). Logical sectors used by the MS to communicate with the BTS are called active sets.

In a mobile communication system, a downlink (DL) and an uplink (UL) are used to transmit data to and from the BTS and the MS. The BTS transmits data to the MS via the DL, while data is transmitted from the MS to the BTS via the UL. Both the UL and DL may utilize two frequency bands. Often, in a mobile communication system, one of the two frequency bands of the UL or DL may be used more often than the other frequency band. Thus, there would be unbalanced usage of the two available frequency bands and the corresponding system resources. For example, most of the information might be transmitted on one frequency band while only a small transmission load is on the other frequency band. Hence, the system wastes its capacity.

Thus, there is a need to avoid unbalanced usage of the frequency bands and system resources. Accordingly, it would be desirable for each MS to be capable of performing a handover from one frequency band to the other in order to equally split the transmission load of the whole system between two available frequency bands.

FIG. 1 illustrates a typical cell 10. The cell 10 is divided into three physical sectors 12, 14 and 16. Physical sector 12 is assigned logical sectors 18 and 20. Logical sector 18 is assigned a frequency band $f_1$. Logical sector 20 is assigned a frequency band $f_2$. Similarly, physical sector 14 is assigned logical sectors 22 and 24. Logical sectors 22 and 24 are assigned frequency band $f_1$ and frequency band $f_2$, respectively. Physical sector 16 is assigned logical sector 26 and 28, which are assigned frequency band $f_1$ and frequency band $f_2$, respectively.

Transmission is accomplished on frequency band $f_1$ and frequency band $f_2$ of each physical sector 12, 14, and 16 via logical sectors 18, 20, 22, 24, 26 and 28. Logical sectors that are located in the same physical sector are referred to as siblings. For example, logical sectors 18 and 20 are siblings. It would be appreciated by those of ordinary skill in the art that it is possible in some situations that only one logical sector of a physical sector might support traffic channels on a single frequency band. Thus, in these situations, a logical sector may transmit a signal that is only used for support of measurements. This is often referred to as Beacon.

It would be further appreciated by those of ordinary skill in the art that the cell 10 may be divided into any number of physical sectors having any number of logical sectors and any number of frequency bands.

There are shortcomings with traditional handover procedures. For example, due to hardware limitations of a MS, the MS might be able to only perform measurements on one of two or more frequency bands at a time. As a consequence, for any physical sector the MS can accomplish quality measurements for one of the two logical sectors, but not for its sibling. In addition, the coverage area of a logical sector and its sibling might be different.

Accordingly, it would be desirable for the MS to be able to perform transmission quality measurements on multiple frequency bands at a time instead of a single frequency band as currently known. As a consequence for any physical sector, the MS should be able to determine transmission quality measurements for multiple logical sectors, including its siblings. In addition, it would be desirable to perform such measurements when the coverage area of a logical sector and its sibling are different. Further, it would be desirable to get information regarding the transmission quality on other frequency bands to enable a MS to carry out an interfrequency handover.

SUMMARY

These and other problems associated with cellular communications are solved by the present invention, wherein a mobile station measures the transmission quality $Q_{F1}$ on frequency band $f_1$ and estimates the quality $Q_{F2}$ on frequency band $f_2$ by adding an offset $Q_{F1,2}$ to the measured transmission quality $Q_{F1}$. Once the estimated transmission quality $Q_{F2}$ exceeds a quality threshold, an interfrequency handover from frequency band $f_1$ to frequency band $f_2$ may be accomplished. The quality threshold may be determined by the system operator or by other means.

A quality offset is used by the mobile station to estimate the quality of a logical sector instead of using actual measurements on the logical sector. In addition, applying the quality offset enables the mobile station to carry out interfrequency handover, even if the mobile station can only perform transmission quality measurements on one frequency band. Furthermore, depending on the number of active mobile subscribers in one physical sector, system capacity may be substantially increased since it is possible to have a more balanced load on the two frequency bands used by the system.

BRIEF DESCRIPTION OF THE DRAWINGS

The present invention will now be described with reference to the accompanying drawings in which.

DETAILED DESCRIPTION

Figure 1:
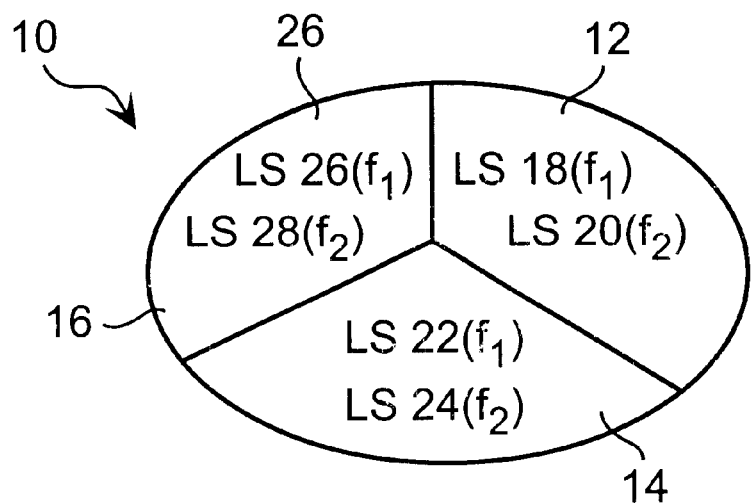
FIG. 1 illustrates a cell of a cellular system divided into three physical sectors, where each physical sector includes two logical sectors and two frequency bands.

In the following description, for purposes of explanation and not limitation, specific details are set forth, such as particular circuits, circuit components, techniques, etc., in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

In order to simplify the discussion of the present invention, the maximum range of frequency band $f_1$ will hereinafter be referred to as either the area of coverage of a cell, the cell boundary, or simply the cell. Further, one skilled in the art will recognize that the maximum range of a frequency band, i.e., a base transceiver station's transmission on the frequency band, is the farthest distance where the mobile station can receive a signal which has a signal strength or quality above a predetermined threshold.

Although the following describes certain measurements and calculations being performed by a mobile station, one skilled in the art will recognize that the measurements and calculations can alternatively be performed in the cellular network. Further, although the following describes certain calculations being performed in the base transceiver station, one skilled in the art will recognize that these calculations may be performed in other parts of the cellular network, e.g., the radio network controller.

For example, although not described in detail herein, the present invention is applicable to radiocommunication systems which employ any type of access methodology, e.g., Frequency Division Multiple Access (FDMA), Time Division Multiple Access (TDMA), Code Division Multiple Access (CDMA), Wideband Code Division Multiple Access (WCDMA), or any hybrid thereof.

Prior to discussing exemplary handoff procedures according to the present invention, conventional handoff procedures are described below. In certain conventional CDMA systems control information is broadcast to mobile stations over a control channel or pilot channel which is known in the art as a Perch channel or a Primary Common Control Physical Channel (PCCPCH). For more information regarding Perch channels the interested reader should refer to co-pending and commonly assigned U.S. patent application Ser. No. 09/112,689 entitled "Method, Apparatus, and System for Fast Base Station Synchronization and Sector Identification" filed Jul. 9, 1998, which is herein incorporated by reference. For ease of explanation the control channel will be herein referred to as the Perch channel. A logical Broadcast Control Channel (BCCH) is mapped, for example, to the information symbols in the Perch channel. The BCCH delivers cell-specific information, e.g., cell identification and sector identification, system-related information, e.g., transmit power, uplink interference power, and cell specific neighboring cell information, e.g., long codes used by neighboring cells, neighboring cells which mobile stations should make measurements upon, etc. In order for a mobile station to identify other base transceiver stations to handoff to, the mobile station identifies the Perch channels for the surrounding base transceiver stations using the long codes supplied as described above. Using these long codes the mobile station can make continuous measurements of the Perch channels associated with neighboring cells to identify potential base transceiver stations as handoff candidates.

In conventional CDMA systems when a mobile station is communicating using real time services such as speech, the mobile station is continuously transmitting and receiving. Accordingly, in typical CDMA systems a mobile station cannot make measurements on other frequencies without a second receiver. However, a second receiver adds to the weight and complexity of the mobile station. One proposed solution which allows a mobile station to make measurements on another frequency is to vary the duty cycle of transmissions to operate in a so-called "compressed mode". In the compressed mode the information in the traffic channel is compressed in time and sent in one or more shorter bursts than normal. Since the information on the traffic channel is received in less time, the mobile station can use the extra time to make measurements on other frequencies. However, using less time for the same amount of information means that a higher transmission rate must be used. The higher transmission rate leads to an increase in the amount of power used, and in turn, a greater amount of interference. Accordingly, it would be desirable to be able to make measurements on Perch channels transmitted on other frequencies without an additional receiver and without using the compressed mode.

According to the present invention, a method for determining whether the second frequency band $f_2$ has an acceptable signal quality for a connection between a particular mobile station and base transceiver station can be referred to as the offset method. According to this method the mobile station, or the base transceiver station, if the handoff decisions are made therein, is informed of the power level offset between a Perch channel 1 transmitted on frequency band $f_1$ and a Perch channel 2 on frequency band $f_2$. Since the mobile station is already measuring the Perch channel 1 on frequency band $f_1$, the determination of whether the frequency band $f_2$ provides an acceptable signal quality can take into account this power level offset. For example, handoff decisions may be based upon pathloss to the base transceiver station by subtracting the received Perch channel power from the power at which the Perch channel was transmitted from the base transceiver station. One skilled in the art will recognize that handoff decisions can also be based upon other parameters such as signal-to-noise ratio, received signal strength indicator (RSSI), delay, bit error rate (BER), frame error rate, (FER), or any combination of these parameters.

Figure 2:
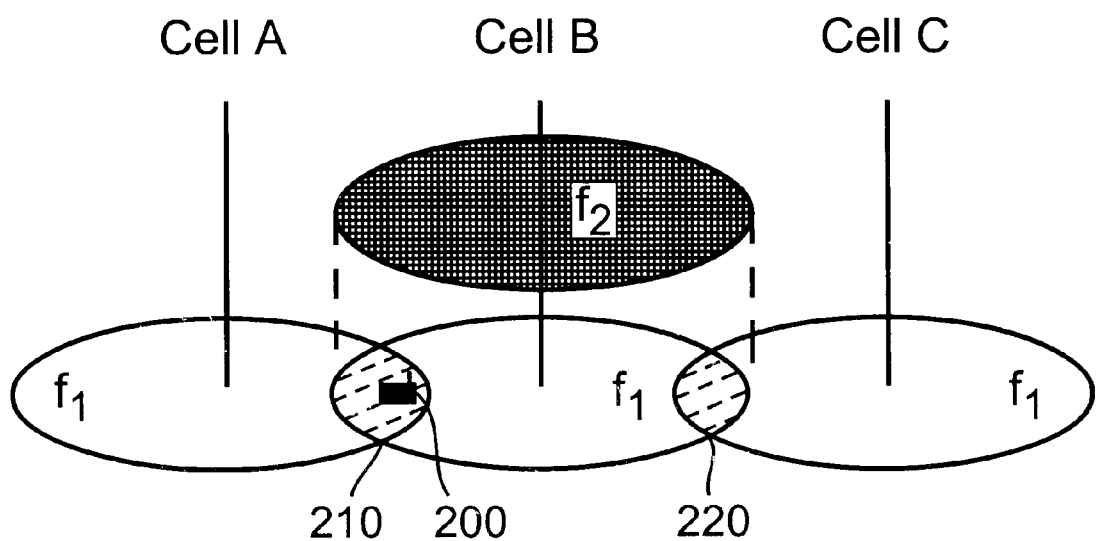
FIG. 2 illustrates a typical cellular system with three cells.

FIG. 2, by way of example, illustrates a cellular system having cells A, B and C. The cells A, B and C use a frequency band $f_1$. Cells A, B and C spread communication signals over first frequency band $f_1$. The cells overlap each other at the shaded regions 210 and 220 so that there are minimal interruptions to an ongoing call during handover. Accordingly, when a mobile station 200, which is communicating with a base transceiver station in cell A over frequency band $f_1$, moves from an area completely contained within cell A to shaded region 210, the connection between mobile station 200 and cell A will cause interference to connections in cell B, which also are communicating on frequency band $f_1$, until handoff occurs to cell B. The mobile station 200 will measure the received power of Perch channel 1. When the mobile station 200 is measuring Perch channel 1 on frequency band $f_1$ in cell B, the Perch channel can inform the mobile station 200 of the transmitted power of frequency band $f_1$ and the power offset between frequency band $f_1$ and frequency band $f_2$ in cell B. The mobile station 200 then calculates the pathloss for frequency band $f_1$. The mobile station 200 can estimate the pathloss for frequency band $f_2$ by adding the offset value from the pathloss which the mobile station 200 determined for frequency band $f_1$ in cell B. Depending on the relation of the transmitted power on frequency band $f_1$ compared to that on frequency band $f_2$ the offset value might be positive or negative.

A mobile station might decide to handoff from frequency band $f_1$ to frequency band $f_2$ when the quality measured on Perch channel 1 has decreased below a certain threshold. Similarly, a mobile station will handoff from frequency band $f_2$ to frequency band $f_1$ when the quality measured on Perch channel 2 sent on frequency band $f_2$ has increased above a certain threshold. One skilled in the art will readily recognize that similar thresholds can be implemented if the handoff decisions are based on RSSI or SIR.

Many mobile stations within a certain physical sector perform transmission on one of the two frequency bands, e.g., frequency band $f_1$ and only a few on the other frequency band ($f_2$). In this case system performance is rather unbalanced, i.e., while performance degrades on frequency band $f_1$ due to heavy usage, there is only a slight system load on frequency band $f_2$. Therefore, in order to increase the overall system performance on both frequency bands, it would be desirable to equally distribute users among both frequency bands. In case of the above example, a mobile station must be able to perform an interfrequency handover from one frequency band to the other within the same or different physical sectors. Such an interfrequency handover is performed in the way that the mobile station measures the transmission quality on several logical sectors and compares these qualities with respect to a predetermined quality threshold. One of ordinary skill in the art would appreciate that the transmission quality that is used for comparing frequencies can be of several types. For example, in WCDMA system, the received energy per chip divided by the noise power density in the frequency band may be utilized (Ec/No). In addition, the received signal code power divided by the interference signal code power may also be utilized which may be referred to as the signal-to-interference ratio (SIR). The SIR may be defined as the Received Signal Code Power (RSCP) divided by the Interference Signal Code Power (ISCP). Furthermore, the pathloss may be utilized (i.e., the received signal code power minus the transmitted power).

It is important to note that the quality measurements are filtered for a predetermined filter length. The reason for this is that for handover the focus is to get information of the long term characteristic (slow fading) of the channels rather than its short term characteristic (fast fading effects). Due to the fact that the long term channel characteristics on the two frequency bands $f_1$ and $f_2$ will be correlated, it is possible to estimate the transmission quality on frequency band $f_2$ by measuring only the transmission quality on frequency band $f_1$ and adding an appropriate offset value to the transmission quality measured on frequency band $f_1$. For example, with respect to pathloss, it is assumed that the dynamics of the channel with respect to slow fading and pathloss are much greater than for fast fading, i.e., dynamic(slow fading+pathloss)/dynamic(fast fading)>>1.

According to the invention, since the mobile station is unable to measure the DL transmission quality on both frequency bands ($f_1$ and $f_2$), the mobile station can estimate the transmission quality on the second frequency band $f_2$ by measuring the transmission quality on the first frequency band $f_1$ and adding an appropriate offset to this transmission quality value on the first frequency band $f_1$. The offset may be a function of the ratio of the DL transmission power on frequency band $f_1$ compared to the DL transmission power used on frequency band $f_2$. For example, a straightforward solution to calculating the offset is to take the ratio of DL transmission power on frequency band $f_2$ with respect to the one used on frequency band $f_1$, given in dB:

Offset=10 log (DL power(frequency band $f_2$)/DL power(frequency band $f_1$))

Thus, by way of example, if the transmitted DL power on frequency band $f_2$ is twice the transmitted DL power on frequency band $f_1$, then the offset value is +3 dB. By contrast, if the transmitted DL power on frequency band $f_2$ is half of the transmitted DL power on frequency band $f_1$, then the offset value is −3 dB.

Applying such a sector specific offset, a processor associated with the mobile station can calculate and estimate the quality on frequency bands that it cannot measure the quality. This method enables the mobile station to carry out an interfrequency handover within one physical sector from frequency band $f_1$ to frequency band $f_2$.

Figure 3:
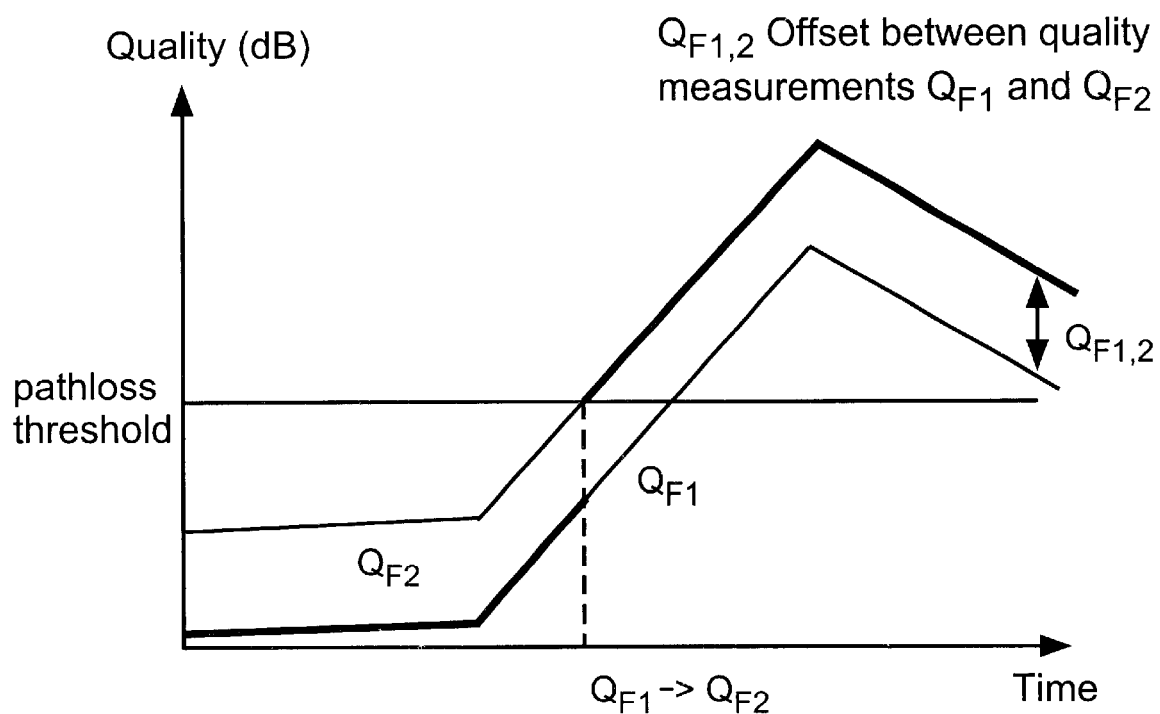
FIG. 3 illustrates an interfrequency handover according to the present invention.

FIG. 3, by way of example, illustrates an exemplary embodiment of an interfrequency handover according to the invention. A mobile station (not shown) measures the transmission quality $Q_{F1}$ on frequency band $f_1$ and estimates the transmission quality $Q_{F2}$ on frequency band $f_2$ by adding an offset $Q_{F1,2}$ to the measured transmission quality $Q_{F1}$. Once the estimated transmission quality $Q_{F2}$ exceeds an absolute quality threshold e.g., (a pathloss threshold in this example), an interfrequency handover from frequency band $f_1$ to frequency band $f_2$ may be accomplished. The quality threshold may be determined by the system operator or by other means.

According to the invention, a quality offset is used by the mobile station to estimate the quality of a logical sector that the mobile station cannot perform measurements on. In addition, applying the quality offset enables the mobile station to carry out interfrequency handover, even if the mobile station can only perform measurements of the quality on one frequency band. Furthermore, depending on the number of active mobile subscribers in one physical sector, system capacity can be substantially increased since it is possible to have a more balanced load on the two frequency bands used by the system.

According to the present invention, using the sector specific offset, the MS can now calculate a quality estimate for a logical sector on a frequency band the mobile station does not perform measurements on. This feature enables handover between logical sectors of different frequency bands. In addition, the traffic load will be more evenly balanced between the two frequency bands used for information transmission. Thus, system resources will be efficiently used. It is believed that the system capacity will be improved as compared to the case where the system contains two frequency bands but cannot perform handover due to the fact that the MS can only perform measurements on one frequency band at a time.

The present invention has been described by way of exemplary embodiments to which the invention is not limited. Modifications and changes will occur to those skilled in the art without departing from the spirit in scope of the invention as defined in the claims.

What is claimed is:

1. In a cellular system, a method for performing handover, the method comprising the steps of:
   determining a transmission quality on a first frequency band;
   determining a quality offset;
   estimating the transmission quality of a second frequency band based on the quality offset by adding the quality offset to the transmission quality on the first frequency band; and
   initiating a handover from the first frequency band to the second frequency band according to the estimated transmission quality of the second frequency band.

2. The method of claim 1, further comprising the step of determining a quality threshold.

3. The method of claim 2, wherein the handover occurs once the transmission quality on the second frequency band exceeds the quality threshold, provided that the quality offset is positive.

4. The cellular system of claim 1, wherein the cellular system comprises at least one cell having at least two logical sectors such that one of the logical sectors is assigned to the first frequency band and the other logical sector is assigned to the second frequency band.

5. The cellular system of claim 1, wherein the quality offset is a function of the ratio of downlink transmission power on the second frequency band compared to downlink transmission power on the first frequency band.

6. The cellular system of claim 5, wherein the quality offset is a function of the ratio of downlink transmission power (DL power) on the second frequency band (f2) and the first frequency band (f1), according to the relation:

Quality Offset=10 log (DL power(f2)/DL power(f1)).

7. A quality determining means in a cellular system, comprising,
   measurement means for measuring a first transmission quality on a first frequency band;
   determining means for determining a quality offset; and
   processing means for estimating a second transmission quality on a second frequency band by adding the quality offset to the first transmission quality,
   wherein a handover from the first frequency band to the second frequency band is initiated according to the second transmission quality.

8. The quality determining means in the cellular system as in claim 7, wherein the cellular system comprises at least one cell having at least two logical sectors such that one of the logical sectors is assigned to the first frequency band and the other logical sector is assigned to the second frequency band.

9. The quality determining means in the cellular system as in claim 7, wherein the quality offset is a function of the ratio of downlink transmission power on the second frequency band compared to downlink transmission power on the first frequency band.

10. The quality determining means in the cellular system as in claim 9, wherein the quality offset is a function of the ratio of downlink transmission power (DL power) on the second frequency band (f2) and the first frequency band (f1), according to the relation:

Quality Offset=10 log (DL power(f2)/DL power(f1)).

11. A control means in a cellular system comprising a quality determining means,
   the quality determining means comprising,
      measurement means for measuring a first transmission quality on a first frequency band;
      determining means for determining a quality offset; and
      processing means for estimating a second transmission quality on a second frequency band by adding the quality offset to the first transmission quality,
   the control means further comprising means for determining a quality threshold, wherein a handover from the first frequency band to the second frequency band is initiated once the second transmission quality exceeds the quality threshold, provided that the quality offset is positive.

12. The control means of claim 11, wherein the control means is disposed in a switch of a cellular system.

13. The control means of claim 11, wherein the control means is disposed in a mobile station of a cellular system.

14. The control means in the cellular system as in claim 11, wherein the cellular system comprises at least one cell having at least two logical sectors such that one of the logical sectors is assigned to the first frequency band and the other logical sector is assigned to the second frequency band.

15. The control means in the cellular system as in claim 11, wherein the quality offset is a function of the ratio of downlink transmission power on the second frequency band compared to downlink transmission power on the first frequency band.

16. The control means in the cellular system as in claim 15, wherein the quality offset is a function of the ratio of downlink transmission power (DL power) on the second frequency band (f2) and the first frequency band (f1), according to the relation:

Quality Offset=10 log (DL power(f2)/DL power(f1)).

17. A cellular system comprising a base transceiver station and a mobile station that transmits signals across a first frequency band to each other, the cellular system measures the transmission quality on the first frequency band, wherein the cellular system determines a quality offset and estimates the transmission quality on the second frequency band by adding the quality offset to the transmission quality on the first frequency band, and wherein a handover from the first frequency band to the second frequency band is initiated according to the estimated transmission quality of the second frequency band.

18. The cellular system of claim 17, wherein the cellular system comprises at least one cell having at least two logical sectors such that one of the logical sectors is assigned to the first frequency band and the other logical sector is assigned to the second frequency band.

* * * * *